United States Patent [19]

Hennig

[11] Patent Number: 5,074,733

[45] Date of Patent: Dec. 24, 1991

[54] UNIVERSAL BALE SHUTTLE

[76] Inventor: Emmett D. Hennig, P.O. Box 43 A, Decatur, Nebr. 68020

[21] Appl. No.: 615,041

[22] Filed: Nov. 19, 1990

[51] Int. Cl.$^5$ .......................................... A01D 90/00
[52] U.S. Cl. .................. 414/24.5; 414/459; 414/495; 414/474
[58] Field of Search ............... 414/24.5, 25, 459, 495, 414/474, 626

[56] References Cited

U.S. PATENT DOCUMENTS

| | | | |
|---|---|---|---|
| 4,072,241 | 2/1978 | Parker et al. | 414/24.5 |
| 4,207,790 | 5/1980 | Baxter | 414/24.5 |
| 4,227,844 | 10/1980 | Love | 414/24.5 |
| 4,537,548 | 8/1985 | Lockhart | 414/24.5 |
| 4,773,806 | 9/1988 | Beaulieu | 414/24.5 |

FOREIGN PATENT DOCUMENTS

| | | | |
|---|---|---|---|
| 1100914 | 5/1981 | Canada | 414/24.5 |
| 2026429 | 2/1980 | United Kingdom | 414/24.5 |
| 2044722 | 10/1980 | United Kingdom | 414/24.5 |
| 2068329 | 12/1981 | United Kingdom | 414/24.5 |

*Primary Examiner*—Frank E. Werner
*Assistant Examiner*—Craig Slavin
*Attorney, Agent, or Firm*—John A. Beehner

[57] ABSTRACT

The universal bale shuttle includes a fram having at least one pair of wheels adapted to rollably carry the frame across terrain. The frame is provided with means capable of raising or lowering the frame in relation to the terrain surface. The frame also includes means for connecting a tractor whereby the frame may be steerably moved behind and to either side of a towing tractor. Pivotally attached to the frame is at least one bale engagement surface adapted to be controllably rotated between a bale disengagement position and a bale engagement position. A bale may be moved about by first steering the shuttle to either side of the tractor and then placing the bale engagement surface in a disengaged position. The shuttle may then be towed to a position where it surrounds a bale to be moved. The frame is then lowered and the bale engagement surface is then placed in an engaged position. Once the bale has been engaged it is lifted from the terrain surface. In this position the bale may be moved to a new location whereupon the bale may be lowered and disengaged from the shuttle.

23 Claims, 10 Drawing Sheets

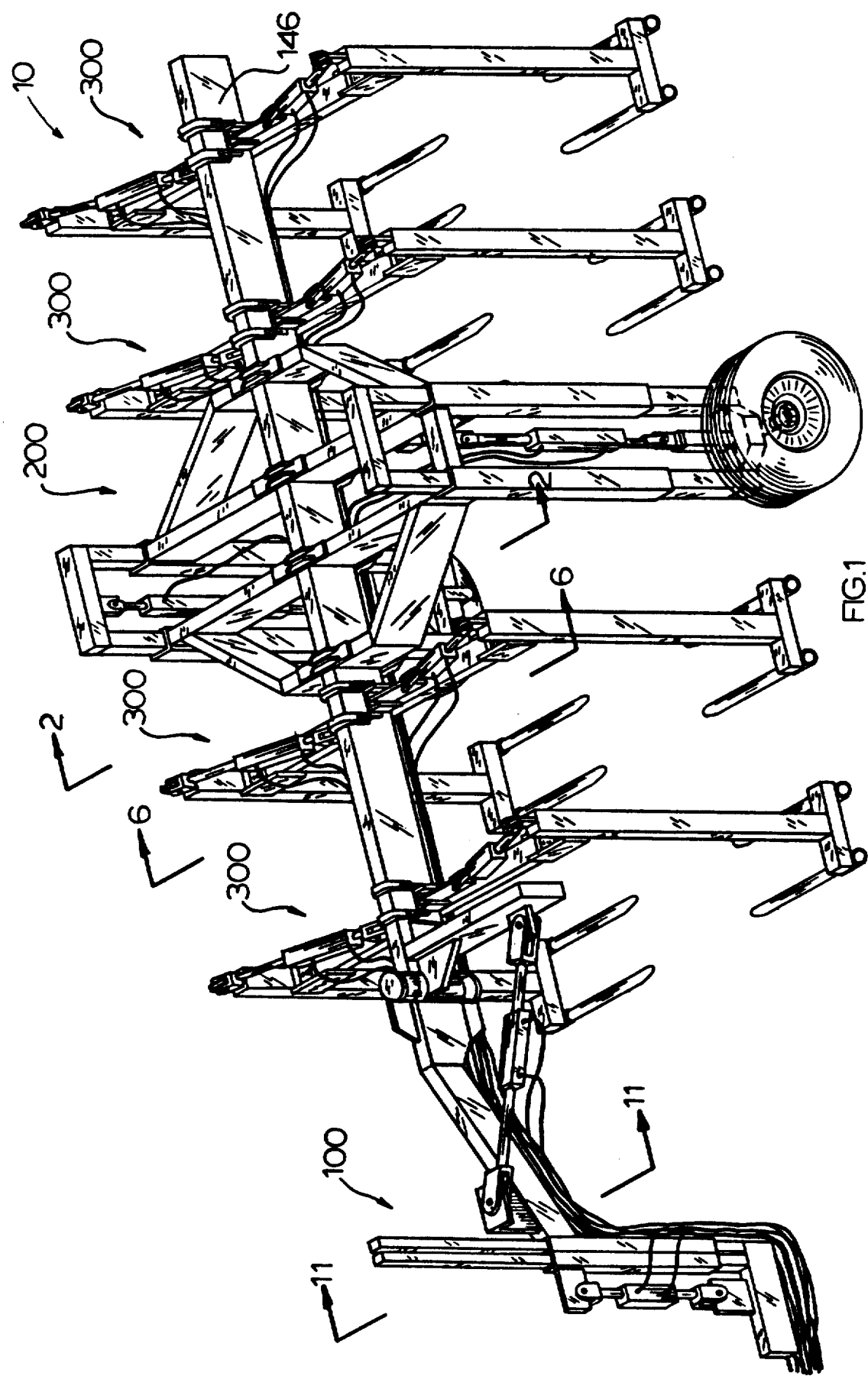

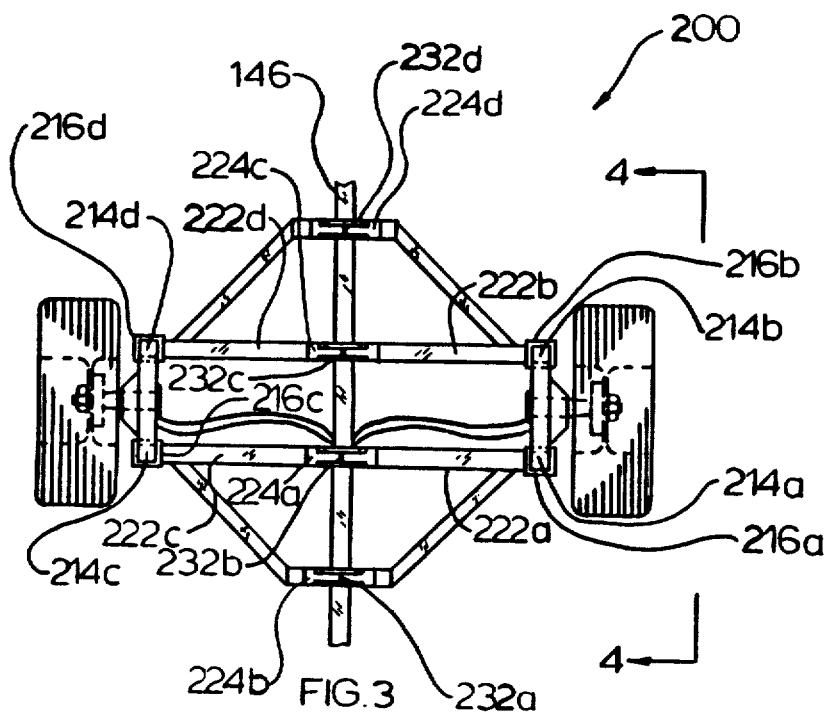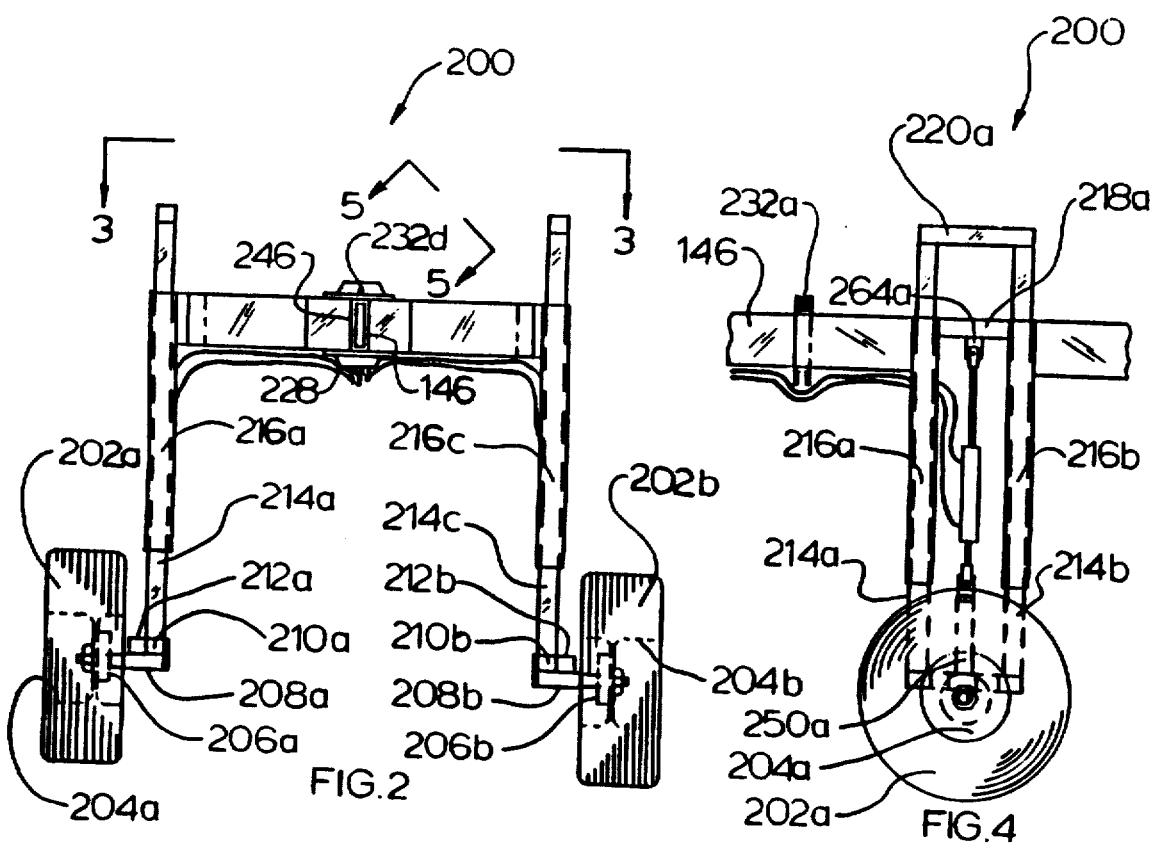

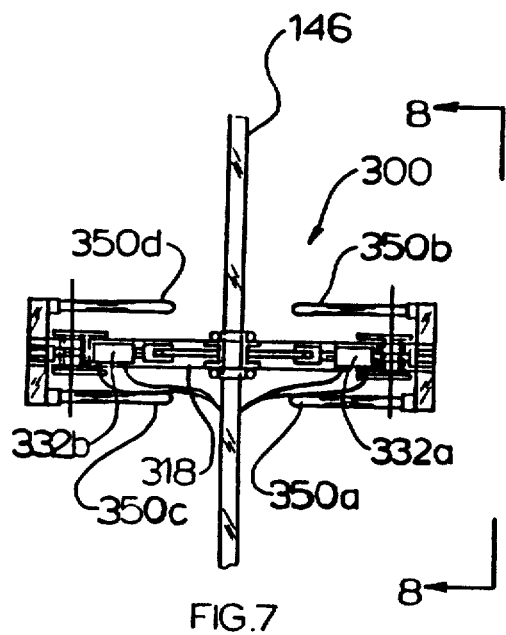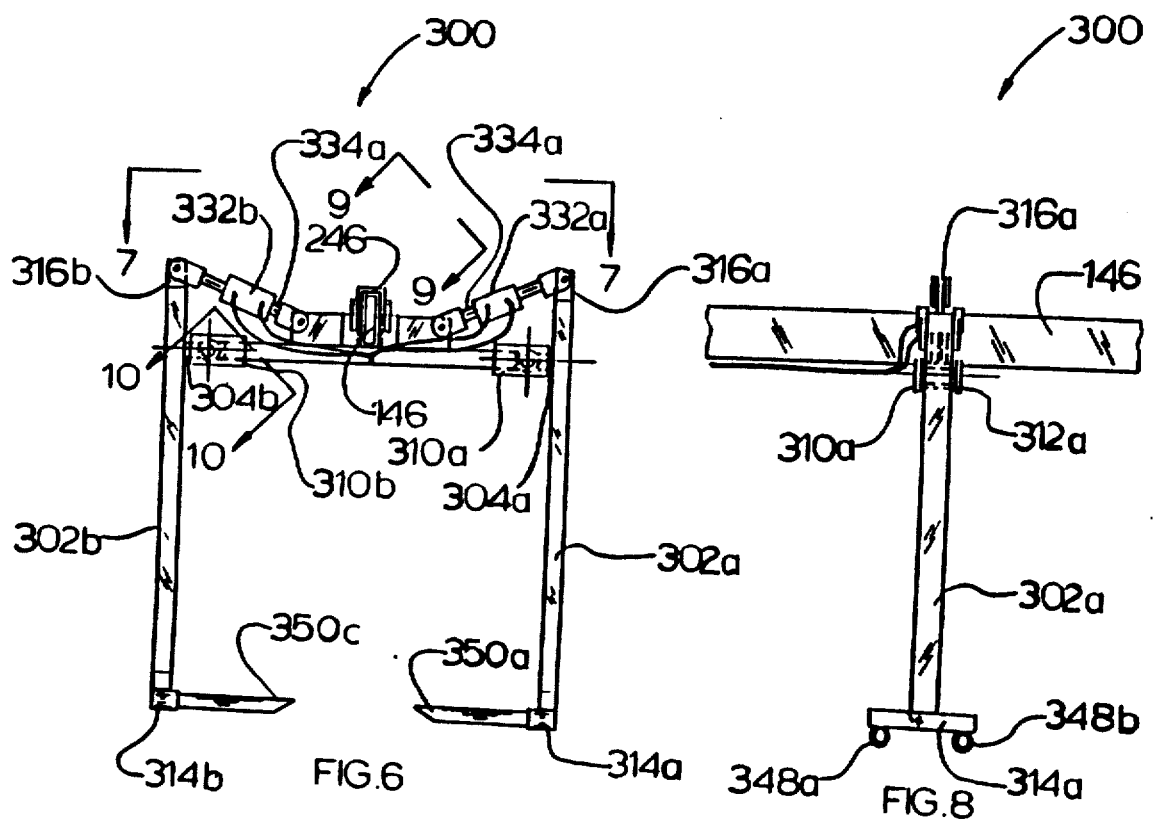

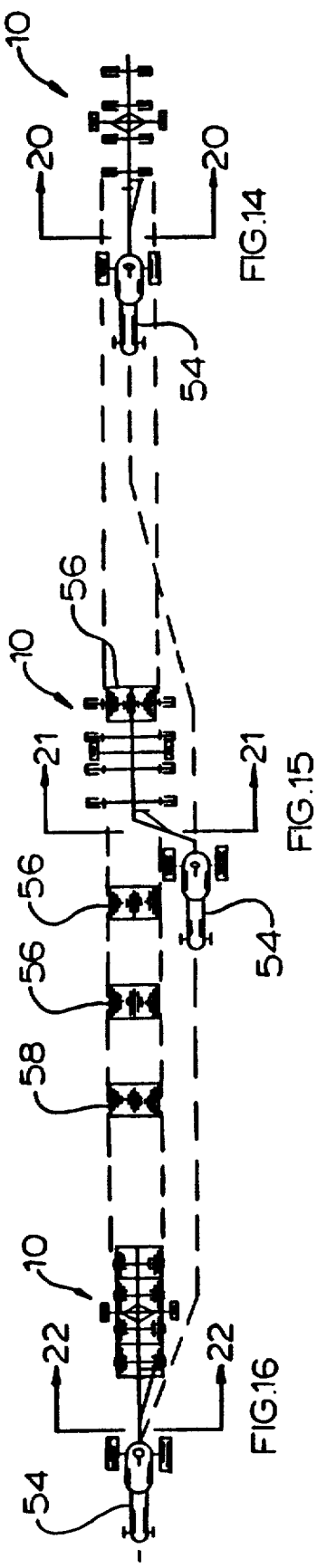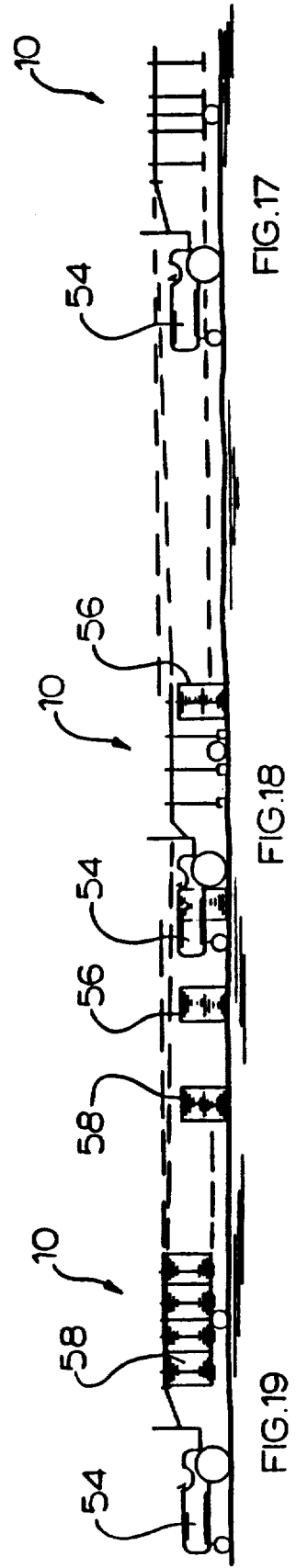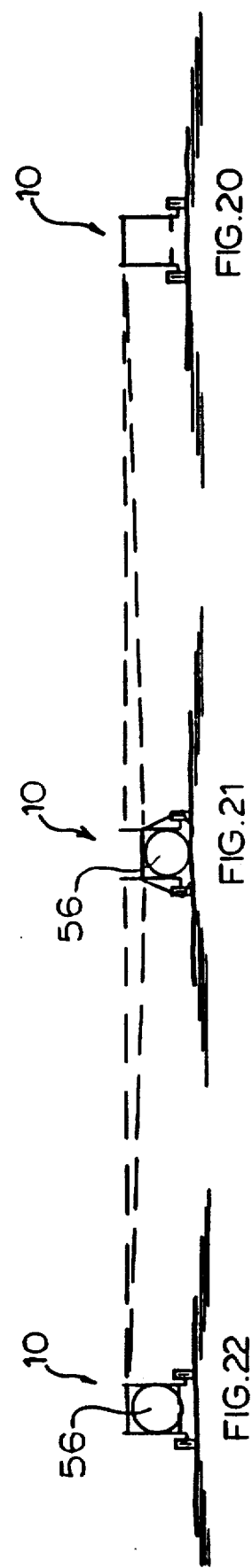

UNIVERSAL BALE SHUTTLE

BACKGROUND OF THE INVENTION

1. Technical Field

The present invention is directed to devices adapted to transport bales and more particularly to a universal bale transport shuttle capable of transporting broken and irregular bales.

2. Description of the Prior Art

Various devices are used in a number of industries to transport baled, paletted, or contained goods. The present invention is directed to devices adapted to transport baled goods such as farm commodities.

Throughout each state of the United States and in almost every province of Canada grass, clover, alfalfa, and the like are grown as feed stock for foraging livestock. These crops are cut, baled, and often stored before they are used as feed. Perhaps the most important of these foraging crops is alfalfa.

Alfalfa is grown both as a cash crop sold to ranchers and the like for winter feed for livestock and by dairymen who feed alfalfa in large quantities in order to produce extra-rich milk.

Once alfalfa has matured it is usually cut with a mower conditioner or a self propelled windrower. After the mowing process the cut alfalfa lays in the field in a long row or a series of rows. Because the alfalfa will rot if left in the field it must be gathered and placed in storage.

The most popular method of gathering and storing alfalfa is to gather it in tight bales that are bound together by either plastic or sisal twine. These bales may be rectangular or round. Rectangular bales are usually moved, stacked, and then stored for eventual sale or feeding. It is not necessary to stack round bales and many growers simply leave the bales in the producing field at the point at which they were discharged from the baler. However, since these bales will encumber later cuttings they are usually transported for storage after the baling process.

Gathering alfalfa and the like in rectangular bales is more labor intensive since the bales must be stacked. However, balers forming either large or small rectangular bales are available. Because of their size and mass large rectangular bales are difficult to stack or move and until now there has not been an easy method of handling these bales. Additionally, it is known that rectangular bales decompose more quickly than round bales. It is for these reasons that most commercial alfalfa producers utilize round bales.

Round and rectangular bales bound with plastic twine are less likely to fall apart with time than bales bound in sisal or hemp twine. However, plastic twine poses a serious hazard to livestock since livestock often ingest or trip on spent plastic twine. In order to avoid this problem many farmers and ranchers utilize sisal twine or hemp rope.

Bales bound with sisal or hemp twine eventually become irregularly shaped since the twine stretches over time. After more time the twine rots through and the bales break apart.

Several round bale transport devices are currently available. For example, High-Line Mfg, Inc., Box 307, Vonda, SK, SOK 4NO (Canada) offers a device capable of moving a plurality of round bales. However, this device cannot load, transport, and unload broken or irregular shaped bales and is not adapted to transport rectangular bales. Additionally, bales transported in this fashion deteriorate more quickly since movement of the bale leaves another portion of the bale exposed to the terrain surface.

A somewhat similar device is also available from Roose Mfg., Co. Box 322, Pella, Iowa 50219. In addition to having the same disadvantages as the Laurier device the Roose device is difficult to load and unload. Finally, DewEze Mfg., Co., Rt. 2, Box 73, Harper, Kans. 87058 provides a retrofit device adapted to convert a standard pickup into a two round bale transport vehicle. This device is not adapted to load, transport, and unload broken or irregular shaped bales and is not adapted to transport rectangular bales. Additionally, bales located on uneven terrain may not be loaded safely since there is a danger the pickup will be toppled while attempting to load bales from an inclined surface.

Until now rectangular and broken or irregularly shaped bales have been difficult if not impossible to transport.

OBJECTS OF THE INVENTION

Therefore, it is a principal object of the present invention to provide an improved bale shuttle.

Another object of the present invention is to provide a bale shuttle capable of transporting irregular or broken bales.

Another object of the present invention is to provide a bale shuttle capable of transporting either round bales or stacks of rectangular bales.

Another object of the present invention is to provide a bale shuttle capable of removing a bale from rugged uneven terrain without danger or difficulty.

Another object of the present invention is to provide a bale shuttle that may carry a plurality of various types of bales.

Another object of the present invention is to provide a bale shuttle that may be towed by a conventional farm tractor or pickup.

Another object of the present invention is to provide a bale shuttle that is economical to manufacture and durable in use.

Another object of the present invention is to provide a bale shuttle which is efficient in operation and refined in appearance.

Another object of the present invention is to provide a bale shuttle which is simple in construction and trouble free.

Finally, another object of the present invention is to provide a bale shuttle that may be safely operated by a single individual. These and other objects will be apparent to those skilled in the art.

SUMMARY OF THE INVENTION

The universal bale shuttle is adapted to transport baled material. Baled material may be engaged from any angle and may be transported from rugged terrain. Even broken and irregular shaped bales may be shuttled from a field location to a storage location. The shuttle might also be adapted to transport pallets of material or rail containers and the like.

In a preferred embodiment a universal bale shuttle device is disclosed which is adapted to transport round, square, broken, or irregular bales of flora such as alfalfa. The shuttle includes a frame having at least one pair of wheels adapted to rollably carry the frame across terrain. Means capable of raising or lowering the frame in relation to the terrain surface is also provided. The frame is connected to a tractor via means allowing the shuttle to be steerably moved behind and to either side of the tractor.

Pivotally attached to the frame is at least one bale engagement surface adapted to be controllably rotated between a bale disengagement position and a bale engagement position. A bale may be moved about by first steering the shuttle to either side of the tractor and then placing the bale engagement surface in a disengaged position. The shuttle may then be towed to a position where it surrounds a bale to be moved. The frame is then lowered and the bale engagement surface is then placed in an engaged position Once the bale has been engaged it is lifted from the terrain surface. In this position the bale may be moved to a new location whereupon the bale may be lowered and disengaged from the shuttle.

BRIEF DESCRIPTION OF THE DRAWINGS

Other objects and advantages of the invention will become apparent upon reading the following detailed description and upon reference to the drawings, in which:

FIG. 1 is a perspective view of a preferred embodiment of the universal bale shuttle;

FIG. 2 is a front elevational view of the wheel lift and wheel assembly of a preferred embodiment of the universal bale shuttle taken at lines 2—2 of FIG. 1;

FIG. 3 is a top plan view of the wheel lift and wheel assembly of a preferred embodiment of the universal bale shuttle;

FIG. 4 is a side elevational view of the wheel lift and wheel assembly of a preferred embodiment of the universal bale shuttle taken at lines 4—4 of FIG. 3;

FIG. 6 is a front elevational view of a bale clamp assembly of a preferred embodiment of the universal bale shuttle taken at lines 6—6 of FIG. 1;

FIG. 7 is a top plan view of a bale clamp assembly of a preferred embodiment of the universal bale shuttle showing the clamp assembly attached to the horizontal center beam;

FIG. 8 is a side elevational view of a clamp assembly of a preferred embodiment of the universal bale shuttle taken at lines 8—8 of FIG. 7;

FIG. 14 is a diagrammatic top plan illustration of a preferred embodiment of the universal shuttle in use;

FIG. 15 is a diagrammatic top plan illustration of a preferred embodiment of the universal shuttle showing the shuttle turned to the right side of the tractor and picking up a bale;

FIG. 16 is a diagrammatic top plan illustration of a preferred embodiment of the universal shuttle showing the shuttle loaded and turned directly behind the tractor:

FIG. 17 is a diagrammatic side elevational illustration of a preferred embodiment of the universal shuttle showing the shuttle in the same configuration as is shown in FIG. 14;

FIG. 18 is a diagrammatic side elevational illustration of a preferred embodiment of the universal shuttle showing the shuttle in the same configuration as is shown in FIG. 15;

FIG. 19 is a diagrammatic side elevational illustration of a preferred embodiment of the universal shuttle showing the shuttle in the same configuration as is shown in FIG. 16;

FIG. 20 is a diagrammatic side elevational illustration of a preferred embodiment of the universal shuttle showing the shuttle in the same configuration as is shown in FIG. 14 and taken on lines 20—20 of FIG. 14;

FIG. 21 is a diagrammatic side elevational illustration of a preferred embodiment of the universal shuttle showing the shuttle in the same configuration as is shown in FIG. 15 and taken on lines 21—21 of FIG. 15;

FIG. 22 is a diagrammatic side elevational illustration of a preferred embodiment of the universal shuttle showing the shuttle in the same configuration as is shown in FIG. 16 and taken on lines 22—22 of FIG. 16;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Figure 12:
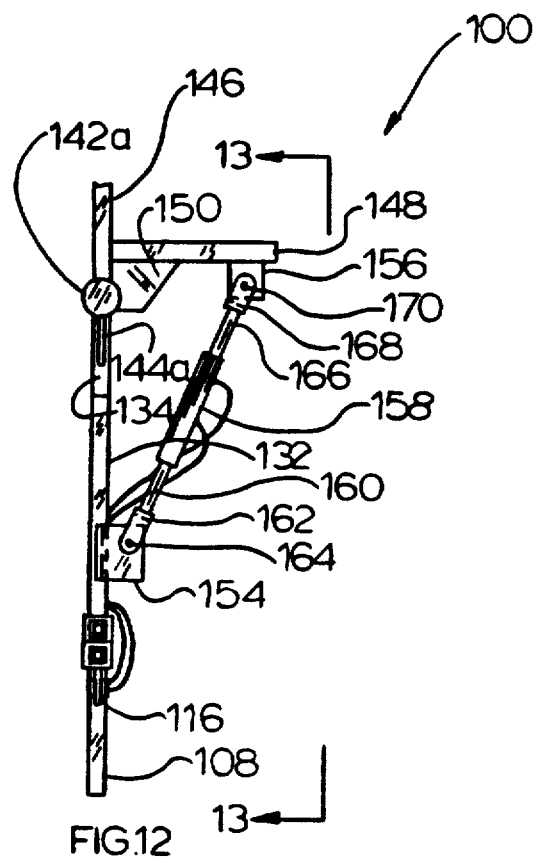
FIG. 12 is a top plan view of the goose neck hitch lift and turn assembly of a preferred embodiment of the universal bale shuttle taken at lines 12—12 of FIG. 11.
Figure 13:
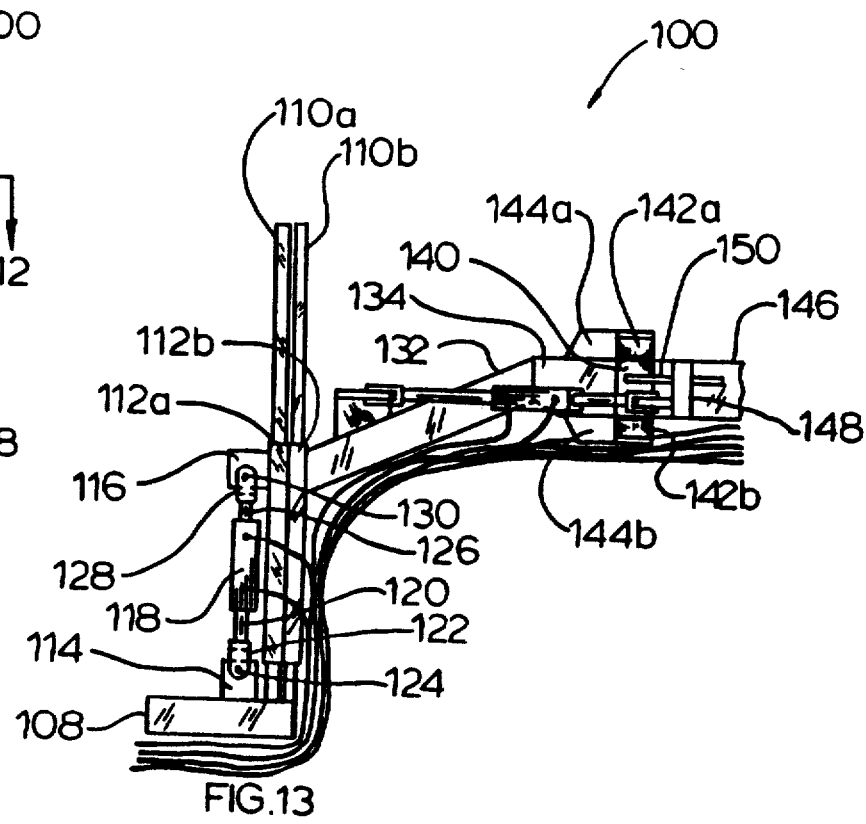
FIG. 13 is a side elevational view of the goose neck hitch lift and turn assembly of a preferred embodiment of the universal bale shuttle taken at lines 13—13 of FIG. 12.
Figure 25:
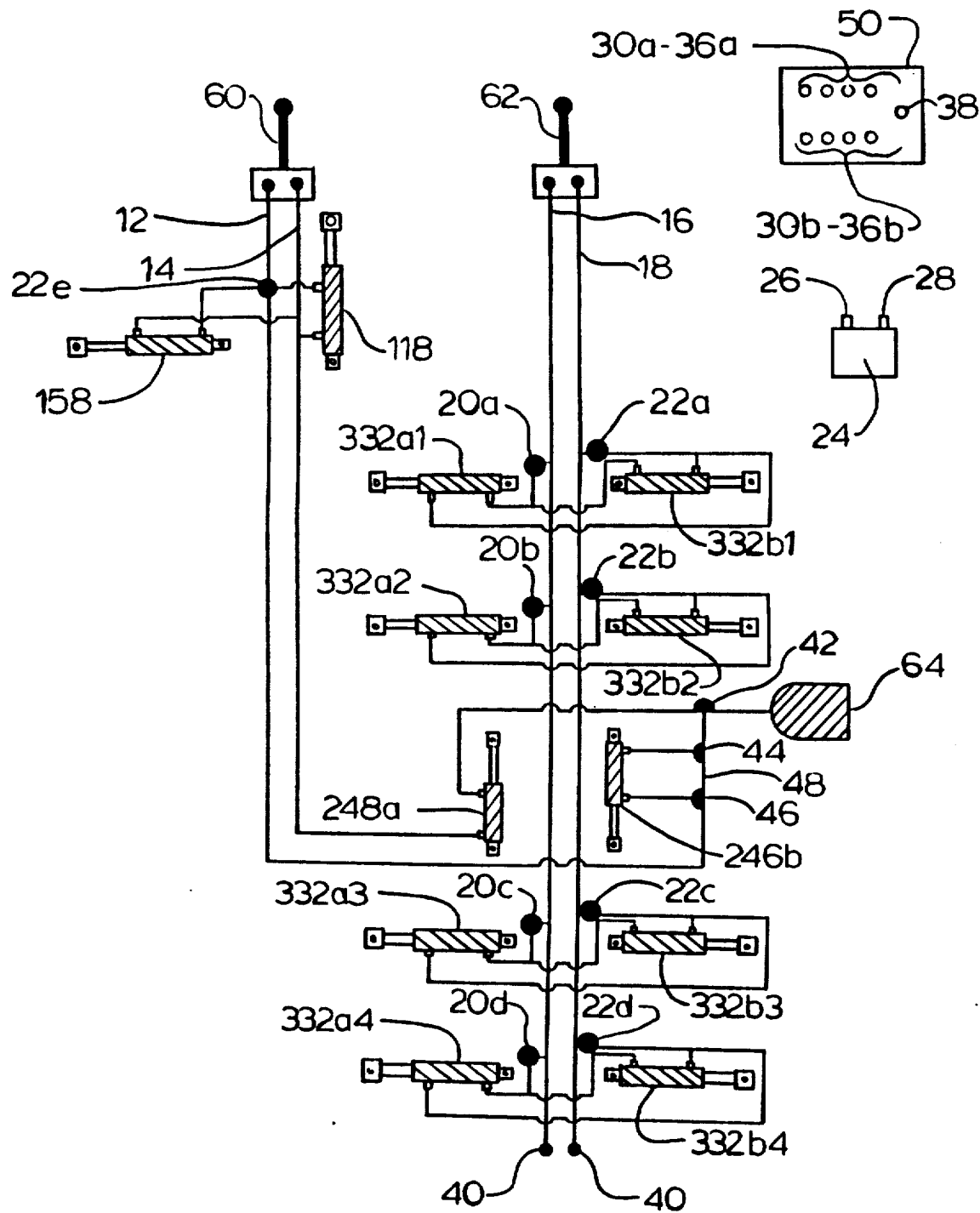
FIG. 25 is a schematic of the electric and hydraulic systems of a preferred embodiment of the universal bale shuttle.

A preferred embodiment of the present invention 10 is illustrated in FIG. 1. FIGS. 2 through 13 illustrate in detail various components of the shuttle 10. FIGS. 2 through 5 illustrate the wheel and wheel lift assembly 200. FIG. 6 through 10 illustrate one of the clamp arm assemblies 300 of a preferred embodiment. FIGS. 11 through 13 illustrate the goose neck hitch lift and turn assembly 100. FIGS. 14 and 22 diagrammatically illustrate the shuttle 10 in use. FIG. 25 schematically illustrates a preferred hydraulic system for use in the preferred embodiment of the shuttle lo depicted in FIG. 1.

In a preferred embodiment the universal bale shuttle 10 is adapted to be towed behind a conventional farm tractor 54 (FIGS. 14 through 22), and the hydraulic cylinders of the shuttle are operated from the hydraulic system of the tractor 54 (FIG. 25).

The shuttle 10 includes a horizontal center beam 146 adjustably raised and lowered at a point close to its center by a wheel and wheel lift assembly 200. The front end of the horizontal center beam 146 is attached to a goose neck hitch lift and turn assembly 100. The goose neck hitch lift and turn assembly 100 acts to adjustably raise and lower the front end of the horizontal center beam 146 as well as to steer the shuttle 10 so as to follow a path parallel to the tractor's 54 path. In this way the shuttle may track clear and to the left or right of the tractor's 54 path.

Adjustably attached in parallel spaced apart relation, perpendicular to and along the horizontal center beam 146, are four clamp arm assemblies 300. Each of these assemblies 300 has a pair of opposing vertical clamp arm beams (302A and 302P) which end in a pair of opposing tines (350A, 350B, 350C, and 350D) adapted to readily engage round 56 or rectangular 58 bales of forage.

The height of the clamp arm assembly 300 tines (350A, 350B, 350C, and 350D) may be raised and lowered simultaneously (or independently) by raising and lowering the horizontal center beam 156 via the goose neck hitch lift and turn assembly 100 and the wheel lift and wheel assembly 200. In a preferred embodiment the front end of the center beam 146 is raised last and lowered first so as to allow the shuttle 10 to readily traverse rough terrain.

The wheel and wheel lift assembly 200 consists of a pair of standard tires (202A and 202B) each mounted on a standard rim (204A and 204B). The rims (204 and 204B) are then rotatably mounted to hubs (206A and 206B) which are mounted to stub axles (208A and 208B). Each of the stub axles (208A and 208B) is welded between opposing ends of a horizontal wheel mount beam (210A and 210B). An axle reinforcement plate (212A and 212B) is welded to the top rear of each stub axle (208A and 208B) and to the front edge of each horizontal wheel mount beam (210A and 210B).

Attached perpendicular to each end of each of the horizontal wheel mount beams (210A and 210B) are a pair of vertical spaced apart parallel vertical lift bars (214A, 214B, 214C, and 214D). Two vertical lift bars (214A and 214B) are mounted to horizontal wheel mount beam 210A and the remaining two vertical lift bars (214C and 214D) are mounted to horizontal wheel mount beam 210B. The horizontal wheel mount beams and the vertical beams are preferably manufactured from 4 inch by 4 inch square tubing.

In order to form a telescoping joint a vertical lift bar housing tube (216A, 216B, 216C, and 216D) is slidably passed over each of the vertical lift bars (214A, 214B, 214C, and 214D). These housings are preferably fabricated from 6 inch by 6 inch square tubing.

Any gap left between the outside diameter of the tubing and the inside diameter of the housing may be closed by welding bar stock along the edges of both ends of the housing. A grease port may also be provided so as to allow the area between the outside diameter of the tubing and the inside diameter of the housing to be lubricated.

Welded between the upper ends of the first set of housings (216A and 216B) is a wheel lift cylinder cross beam 218A Likewise, welded between the upper ends of the second set of housings (216C, and 216D) is a wheel lift cylinder cross beam 218B Welded between the upper ends of the first set of vertical lift bars (214A and 214B) is a vertical lift bar cross beam 218A. Likewise, welded between the upper ends of the second set vertical lift bars (214C, and 214D) is a vertical lift bar cross beam 220B.

Attached perpendicular to the upper end of vertical lift bar housing tube 216A so as to form a horizontal beam which is parallel to but facing in an opposite direction from the stub axle 208A is a cross member beam 222A. Attached perpendicular to the upper end of vertical lift bar housing tube 216B (so as to form a horizontal beam which is parallel to but facing in an opposite direction from the stub axle 208A) is a cross member beam 222B. Attached perpendicular to the upper end of vertical lift bar housing tube 216C so as to form a horizontal beam which is parallel to but facing in an opposite direction from the stub axle 208B is a cross member beam 222D. The cross member beams are preferably manufactured from 4 inch by 12 inch rectangular tubing.

The cross member beam 222A and cross member beam 222C are interconnected in spaced apart relation so as to form a center beam passage 246 by welding the bottom surface of a top plate 224A to the end portions of the top surface of the cross member beams (222A and 222C) and by welding the bottom surface of a bottom plate 228A to the end portions of the bottom surface of the cross member beams (222A and 222C). Welded to the top surface of the top plate 224A, in parallel spaced apart relation, are two reinforcement members (226A1 and 226B1). Welded to the top surface of the bottom plate 228A, in parallel spaced apart relation, are two reinforcement members (230A1 and 230B1).

The cross member beam 222B and cross member beam 222D are interconnected in spaced apart relation (so as to form a center beam passage 246) by welding the bottom surface of a top plate 224C to the end portions of the top surface of the cross member beams (222B and 222D) and by welding the bottom surface of a bottom plate 228C to the end portions of the bottom surface of the cross member beams (222B and 222D). Welded to the top surface of the top plate 224C in parallel spaced apart relation are two reinforcement members (226A2 and 226B2). Welded to the top surface of the bottom plate 228C in parallel spaced apart relation are two reinforcement members (230A2 and 230B2).

As is best depicted in FIG. 3 a first forward cross beam 234 is connected between the wheel end of cross member beam 222A and a forward cross over beam 238A. A second forward cross beam 236 is connected between the wheel end of cross member beam 222C and a forward cross over beam 238B. The forward cross over beam 238A and forward cross over beam 238B are interconnected in spaced apart relation (so as to form a center beam passage 246) by welding the bottom surface of a top plate 224B to the end portions of the top surface of the forward cross over beams (238A and 238B) and by welding the bottom surface of a bottom plate 228B to the end portions of the bottom surface of the forward cross over beams (238A and 238B). Welded to the top surface of the top plate 224B, in parallel spaced apart relation, are two reinforcement members (226A3 and 226B3). Welded to the top surface of the bottom plate 228B in parallel spaced apart relation are two reinforcement members (230A3 and 230B3).

As is best depicted in FIG. 3 a first aft cross beam 240 is connected between the wheel end of cross member beam 222B and a aft cross over beam 244A. A second aft cross beam 242 is connected between the wheel end of cross member beam 222D and a aft cross over beam 244B. The aft cross over beam 244A and aft cross over beam 244B are interconnected in spaced apart relation (so as to form a center beam passage 246) by welding the bottom surface of a top plate 224D to the end portions of the top surface of the aft cross over beams (244A and 244B) and by welding the bottom surface of a bottom plate 228D to the end portions of the bottom surface of the aft cross over beams (244A and 244B). Welded to the top surface of the top plate 224D, in parallel spaced apart relation, are two reinforcement members (226A4 and 226B4). Welded to the top surface of the bottom plate 228D in parallel spaced apart relation are two reinforcement members (230A4 and 230B4).

So that a fewer or greater number of clamp arm assemblies 300 may be positioned along the horizontal center beam 146 the position of the Wheel lift and wheel assembly 200 may be slidably adjusted along the length of the horizontal center beam 146 by loosening the set bolts (232A, 232B, 232C, 232D, 232E, 232F, 232G, and 232H). The wheel lift and wheel assembly 200 may then be moved to the desired balanced position and the set bolts (232A, 232B, 232C, 232D, 232E, 232F, 232G, and 232H) may be re-tightened so as to butt up against the top and bottom surface of the horizontal center beam 146 and thereby locking the assembly 200 along the horizontal center beam 146.

Mounted on the bottom wheel mount beam 210A, directly above the stub axles 208A, is a vertical cylinder adapter post 250A Mounted on the bottom wheel mount beam 210B, directly above the stub axles 208B, is a vertical cylinder adapter post 250B. Attached to the center bottom portion of the wheel lift cylinder cross beam 218A is a wheel lift cylinder attachment plate 264A. Attached to the center bottom portion of the wheel lift cylinder cross beam 218B is a wheel lift cylinder attachment plate 264B.

A conventional double acting hydraulic cylinder 248A having at one end a lower extension bar 252A ending in a lower clevis joint 254A is connected to the vertical cylinder adapter post 250A by coupler pin 256A, and at the other end a ram 258A, ending in a upper clevis joint 260A, is connected to the wheel lift cylinder cross beam 218A by a coupler pin 262A.

A conventional double acting hydraulic cylinder 248B having at one end an upper extension bar 252B ending in an upper clevis joint 254B is connected to the vertical cylinder adapter post 250B by coupler pin 256B, and at the other end a ram 258B, ending in a lower clevis joint 260B, is connected to the wheel lift cylinder cross beam 218B by a coupler pin 262B. Hydraulic cylinders (248A and 248B) are connected to the tractor's 54 hydraulic system in a master cylinder slave cylinder arrangement (FIG. 25).

Figure 24:
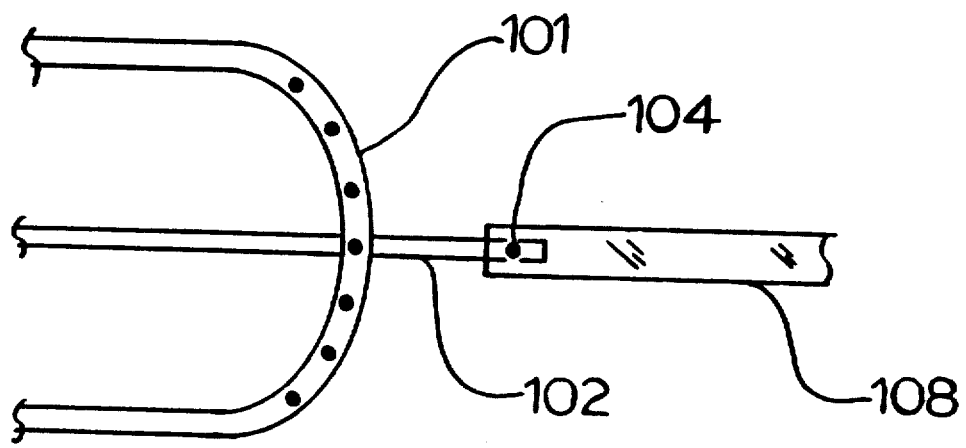
FIG. 24 is a partial sectional plan view of a hitch adapted to be connected to a conventional tractor.
Figure 23:
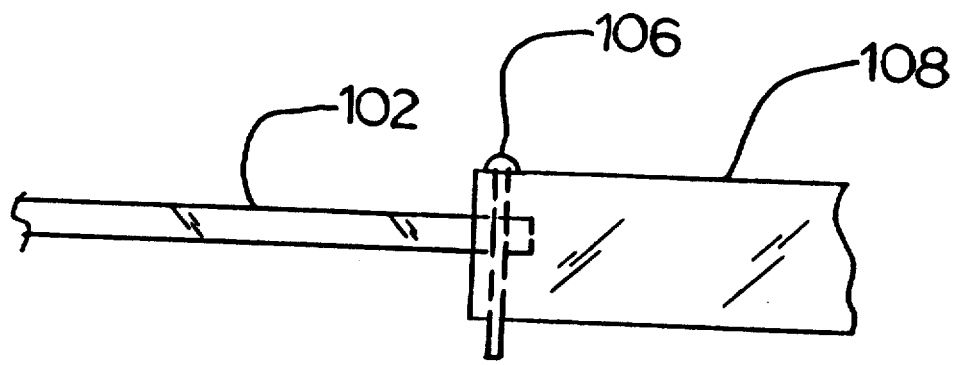
FIG. 23 is a partial sectional elevation view of a hitch adapted to be connected to a conventional tractor.

Attached to the front end of the horizontal center beam 146 is a goose neck hitch lift and turn assembly 100 (FIGS. 11, 12, and 13). The front end of the assembly 100 begins with a hitch beam 102 adapted to be secured to the draw bar of a tractor 54. A hole 104 is formed through the beam 102 and a hitch pin 106 may be used to removably secure the shuttle 10 to the tractor 54 (FIGS. 23 and 24).

The hitch beam 102 is fastened at one end to a horizontal hitch support beam 108. A forward 110A and aft 110B vertical lift bar are mounted in parallel spaced apart relation perpendicular to one end of the support beam 108 (FIG. 13). The vertical lift bars (110A and 110B) are preferably manufactured from 2 inch by 2 inch square tubing.

Mounted forward of the forward vertical lift bar 110A on the upper surface of the hitch support beam 108 is a cylinder attachment plate 114. In order to form a pair of telescoping joints a forward 112A and aft 112B vertical lift bar housing tube is slidably passed over each of the vertical lift bars (110A and 110B). The lift bar housings are preferably manufactured from 3 inch by 3 inch square tubing by welding one surface of each housing (112A and 112B) together.

Any gap left between the outside diameter of the bars and the inside diameter of the housing may be closed by welding bar stock along the edges of both ends of the housing. A grease port may also be provided so as to allow the area between the outside diameter of the bars and the inside diameter of the housing to be lubricated.

Attached to the upper end of the front surface of the forward vertical lift bar housing tube 112A is an upper cylinder attachment plate 116. A conventional double acting hydraulic cylinder 118 having at one end a lower extension bar 120, ending in a lower clevis joint 122, is connected to the lower cylinder attachment plate 114 by coupler pin 124, and at the other end a ram 126, ending in an upper clevis joint 128, is connected to the upper cylinder attachment plate 116 by a coupler pin 130. The hydraulic cylinder 118 is Connected to the tractor's 54 hydraulic system in the manner illustrated in FIG. 25.

Connected to the upper back surface of the aft vertical lift bar housing tube 112D is a goose neck beam 132. The aft end of the goose neck beam 132 is connected to a horizontal turn beam 134. The horizontal turn beam 134 is connected to the front portion of the turn pin housing 140 of the turn joint assembly 136. The horizontal center beam 146 is connected to the rear portion of the turn pin housing 140 of the turn joint assembly 136.

The turn joint assembly 136 includes a vertical turn pin 138 rotatably encased within a turn pin housing 140. The upper end of the vertical turn pin 138 is welded to an upper cap 142A and the lower end is welded to a lower cap 142B. Welded to the upper front portion of the turn pin housing 140 and the upper surface of the horizontal turn beam 134 is a turn joint reinforcement plate 144A. Welded to the lower front portion of the turn pin housing 140 and the upper surface of the horizontal turn beam 134 is a turn joint reinforcement plate 144B.

Mounted horizontally at a 90° angle from the horizontal turn beam 134 is a push beam 148. Mounted to the front surface of push beam 148 is a turn beam and turn joint reinforcement plate 150. Attached to the center front surface of the push beam 148 is a turn beam cylinder attachment plate 156. Also attached to the goose neck is a goose neck beam cylinder attachment plate 154.

Mounted between the turn beam cylinder attachment plate 156 and goose neck beam cylinder attachment plate 154 is a double acting hydraulic cylinder 158. The hydraulic cylinder 158 has a front ram 160, ending in a front clevis joint 162, attached to the goose neck attachment plate 154 with a pin 164. On the opposing side of the cylinder 158 is an aft bar 166, ending in an aft clevis joint 168, attached to the turn beam attachment plate 154 with a pin 170. The hydraulic cylinder 158 is connected to the tractor's 54 hydraulic system in the manner illustrated in FIG. 25.

Adjustably attached in parallel spaced apart relation, perpendicular to and along the horizontal center beam 146, are four clamp arm assemblies 300. Each of these assemblies 300 has a pair of opposing vertical clamp arm beams (302A and 302B) which end in a pair of opposing tines (350A, 350B, 350C, and 350D) adapted to readily engage round 56 or rectangular 58 bales of forage.

Horizontally attached at its center to the clamp arm beam 302A is a tine support beam 346A. Attached to both ends of tine support beam 346A is a tine bracket tube (348A and 348B). A bale tine bar (350A and 350B having a sharp end and an attachment end) is then secured (at its attachment end) within each of the tine bracket tubes (348A and 348B). Welded on the inside surface near the top end of the clamp arm beam 302A is a pivot beam 304A. Welded to the top end of the clamp arm beam 302A is a cylinder attachment plate 314A.

Horizontally attached at its center to the clamp arm beam 302B is a tine support beam 346B. Attached to both ends of tine support beam 346B is a tine bracket tube (348C and 348D). A bale tine bar (350C and 350D having a sharp end and an attachment end) is then secured (at its attachment end) within each of the tine bracket tubes (348C and 348D). Welded on the inside surface near the top end of the clamp arm beam 302B is a pivot beam 304B. welded to the top end of the clamp arm beam 302B is a cylinder attachment plate 314B (FIGS. 6 and 8).

Figure 10:
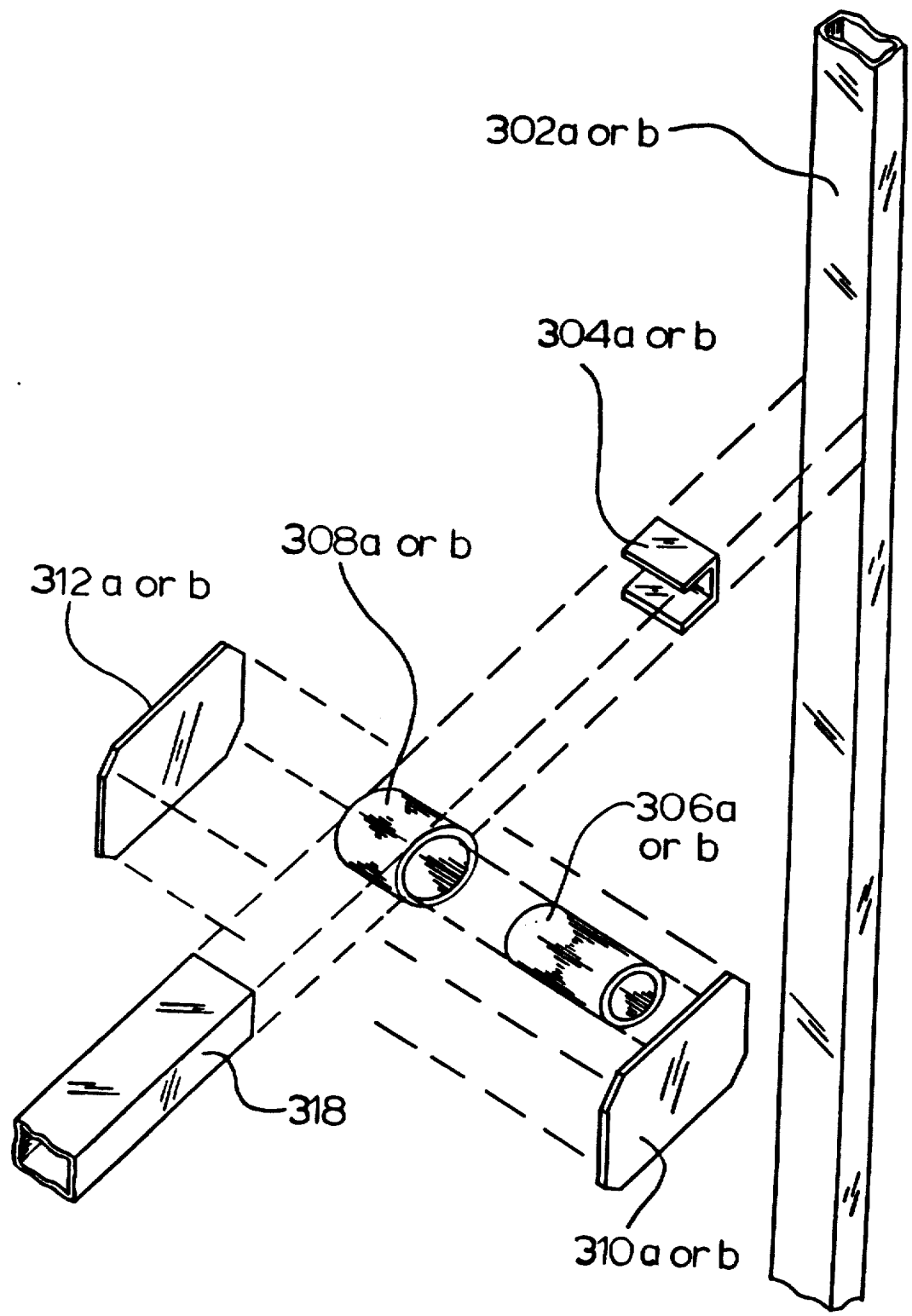
FIG. 10 is a partial sectional exploded view of a clamp arm joint of a preferred embodiment of the universal bale shuttle taken at lines 10—10 of FIG. 6.
Figure 11:
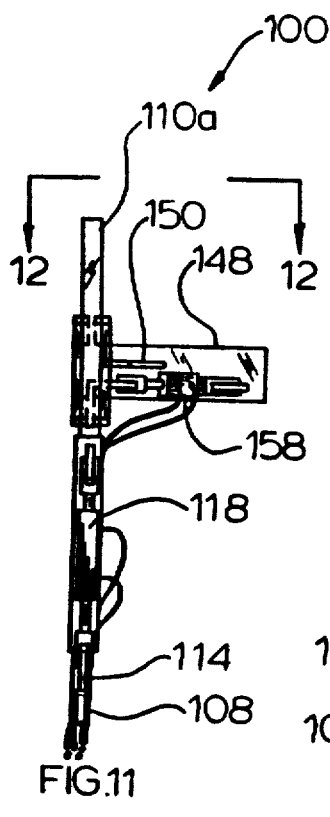
FIG. 11 is a front elevational view of the goose neck hitch lift and turn assembly of a preferred embodiment of the universal bale shuttle taken at lines 10—10 of FIG. 1.

As may be seen from FIG. 10 each of the pivot beams is welded to a joint pin housing (308A and 308B). Each joint pin housing (308A and 308B) rotatably surrounds all but the end portions of each joint pin (306A and 306B). The joint pins (306A and 306B) and each end of a horizontal clamp arm beam are sandwiched between forward (310A and 310B) and aft (312A and 312B) joint assembly pin support plates. Each pivot beam (304A and 304B) is then welded to a joint pin housing (308A and 308B). In this fashion a pair of rotatably opposed clamping arms may be produced (FIGS. 6 and 7).

Figure 5:
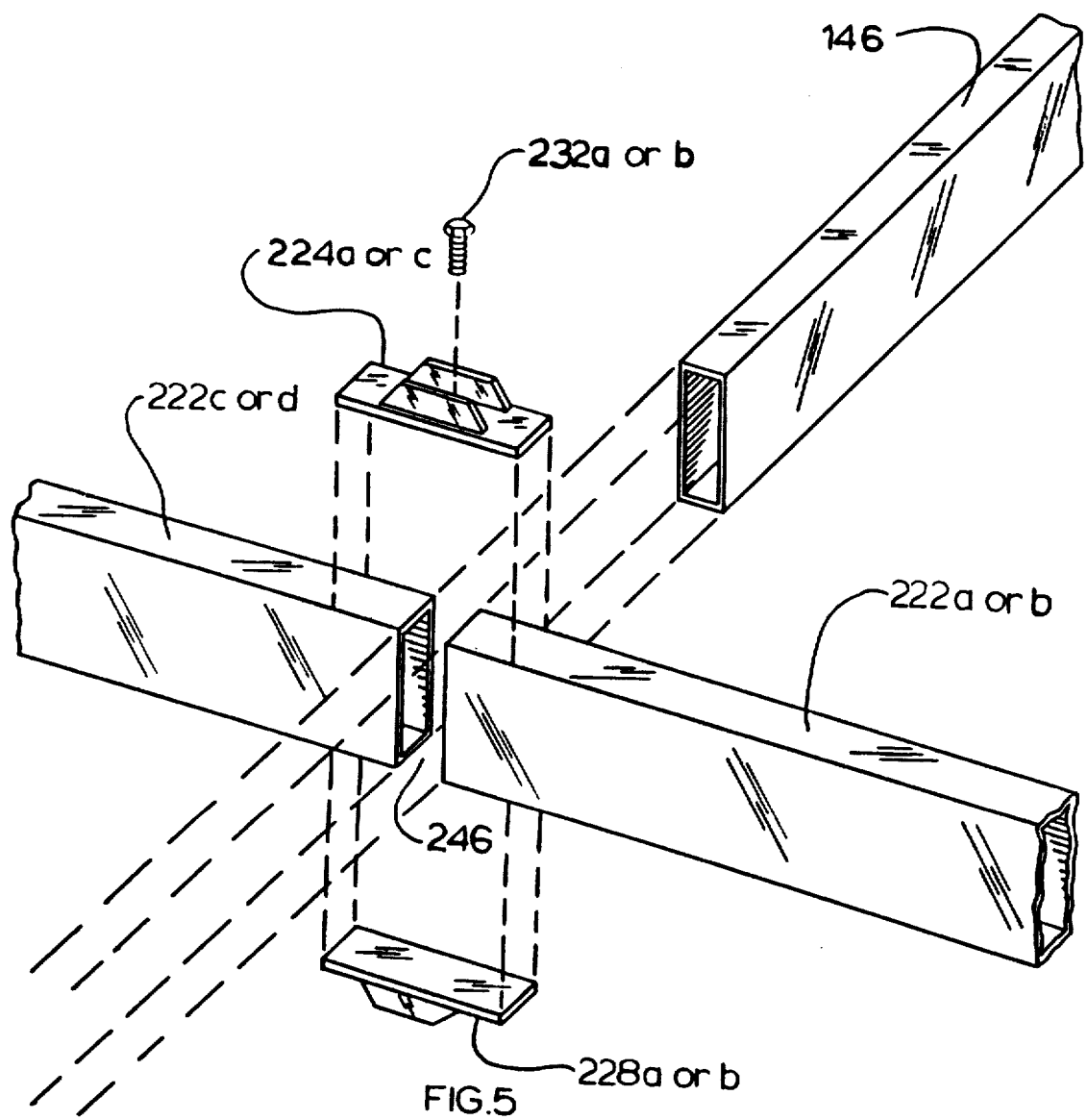
FIG. 5 is a partial sectional exploded view of the center beam wheel lift and wheel assembly adjustable joint of a preferred embodiment of the universal bale shuttle taken at lines 5—5 of FIG. 2.
Figure 9:
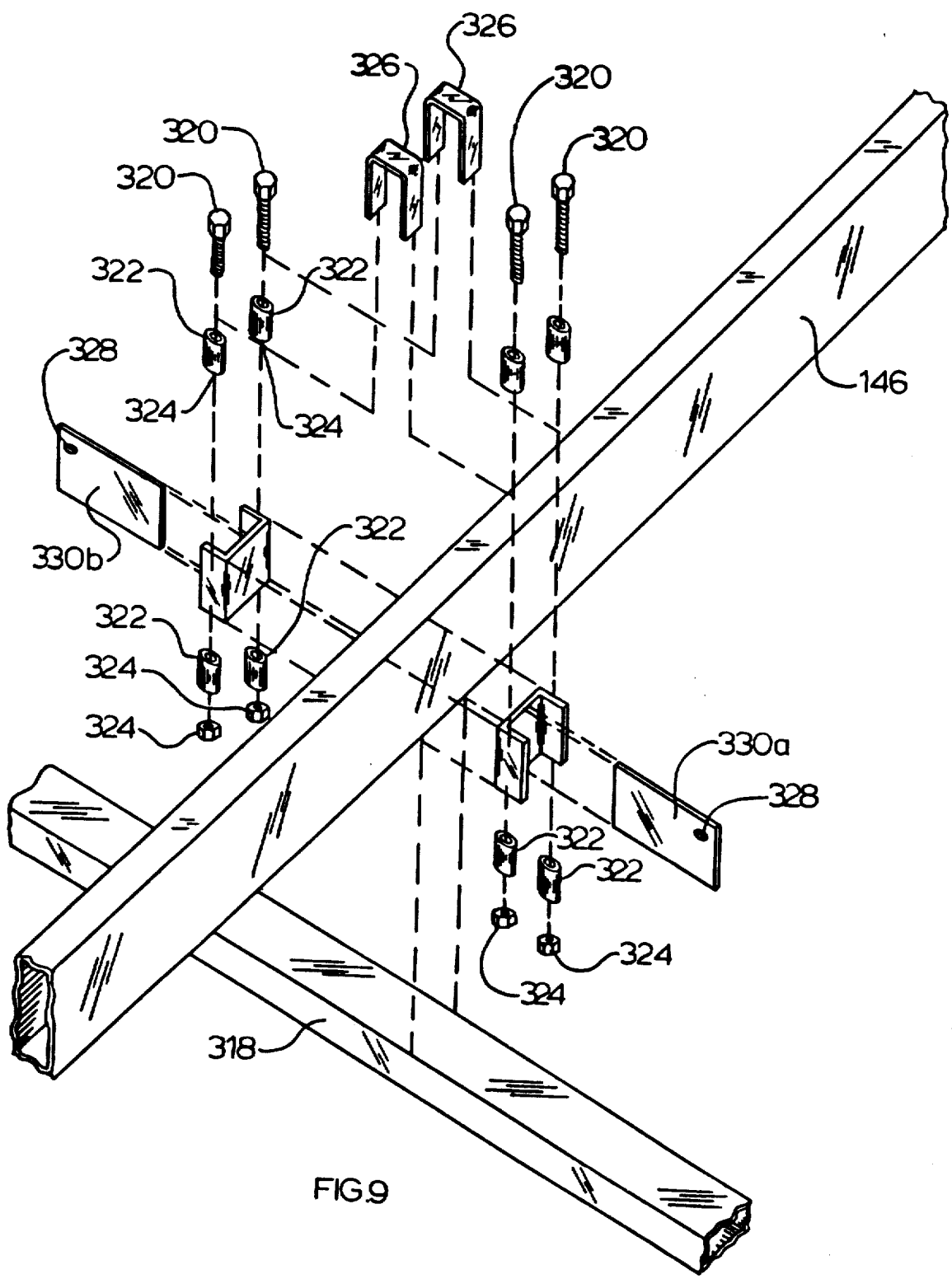
FIG. 9 is a partial sectional exploded view of the adjustable center beam clamp assembly joint of a preferred embodiment of the universal bale shuttle taken at lines 9—9 of FIG. 6.

Welded in a parallel spaced apart relation on either side of the center of the top surface of the horizontal clamp arm beam 318 are a pair of center beam attachment plates (314A and 314B). These plates (314A and 314B) are spaced apart at a distance slightly greater than the width of the horizontal center beam 146 (FIG. 9).

A rectangular attachment plate 330A is then welded at its rear edge to the outside center surface of a center beam attachment plate 314A. The bottom surface of the attachment plate 330A is then welded to the top surface of the horizontal clamp arm beam 318 (FIG. 9). Likewise, a rectangular attachment plate 330B is then welded at its rear edge to the outside center surface of a center beam attachment plate 314B. The bottom surface of the attachment plate 330B is then welded to the top surface of the horizontal clamp arm beam 318 (FIG. 9). Welded to each side of each of the center beam attachment plates (314A and 314B), in parallel spaced apart relation, are a pair of bushings 322.

A pair of bushings 322 are also welded to either side of a pair of U-shaped attachment brackets (326A and 326B). The U-shaped brackets (326A and 326B) may then be fit over the horizontal center beam 146. The horizontal clamp arm beam 318 may then be raised so that the horizontal center beam 146 fits between the center beam attachment plates (314A and 314B) and butts up against the upper surface of the horizontal clamp arm beam 318. A bolt 320 may then be passed through each of the bushings 322 attached to the U-shaped brackets (326A and 326B). The ends of the bolts 320 may then pass through the bushings 322 attached to the center beam attachment plates (314A and 314B) and nuts 324 may then be used to secure the clamp arm assembly 300 to the horizontal center beam 146. As shown best in FIG. 1, a plurality of parallel spaced apart clamp arm assemblies 300 may be attached to a single horizontal center beam 146 such that a plurality of bales (56 or 58) may be transported by the shuttle 10 (FIGS. 16 and 19).

So that the opposing clamping arms of each clamp arm assembly 300 may be controllably rotated from a bale engagement to a bale disengagement position (or vise versa) a hydraulic cylinder 332A is attached between clamp arm cylinder attachment plate 330A and cylinder attachment plate 316A. Likewise, a hydraulic cylinder 332B is attached between clamp arm cylinder attachment plate 330B and cylinder attachment plate 316B (FIGS. 6 and 7).

Both (1) the goose neck hitch lift cylinder 118 and master-slave wheel lift cylinders (248A and 248B); and (2) the goose neck turn cylinder 158 may be independently controlled by tractor 54 hydraulic activation lever 60. Control panel 50 switch 38 may be used to control valve 22E. In this way pressurized hydraulic fluid from the tractor 54 may be selectively used to either raise or lower the shuttle 10 or to turn the shuttle 10.

Hydraulic wheel lift cylinders (248A and 248B) are connected in a master-slave arrangement so as to prevent an uneven extension or retraction of the rams (258A and 258B). A hydraulic fluid reservoir 64, a rephase line 48, and three ball valves (42, 44, and 46) are provided so that if the cylinders depart from phase they may be re-synchronized (FIG. 25).

Each pair of hydraulic cylinders (332A1 and 332B1, 332A2 and 332B2, 332A3 and 332B3, and 332A4 and 332B4) on each of the clamp arm assemblies (300A, 300B, 300C, and 300D) attached to the horizontal center beam 146 may be controlled independently. This is accomplished when an operator activates tractor hydraulic activation lever 62. An electric valve (20A, 22B, 20B, 22B, 20C, 22C, 22D, and 22D) is associated with each cylinder (332A1 and 332B1, 332A2 and 332B2, 332A3 and 332B3, and 332A4 and 332B4 respectively). (FIG. 25). The electric valves (20A, 22B, 20B, 22B, 20C, 22C, 20D, and 22D), and switches (30A, 30B, 32A, 32B, 34A, 34B, 36A, 36B, 38A, and 38B) mounted in control box 50 may then be interconnected with the tractor's battery 24. The valve and switch electrical connections necessary to accomplish the required independent control will be apparent to those skilled in the art.

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described a universal bale shuttle which accomplishes at least all of the stated objects.

I claim:

1. A universal bale shuttle adapted to transport round, square, broken, or irregular bales, comprising:

a transport frame having at least one pair of wheels adapted to rollably carry said transport frame across terrain;

an elongate main frame vertically adjustably carried on said transport frame;

lift means interconnecting said transport frame and main frame for raising or lowering said main frame in relation to said transport frame;

drive means for connecting said transport frame to a propulsion source whereby said transport frame may be moved across terrain;

at least one pair of opposing bale engagement means connected to and depending from said main frame for pivotal movement about a generally longitudinal axis between a bale disengagement position having sufficient clearance between the bale engagement means and main frame to allow movement of said main frame over and about a bale on said terrain and a bale engagement position wherein said pair of bale engagement means engages opposite sides of said bale so as to lift it from said terrain;

said bale engagement means pivotally mounted on said main frame such that said bale engagement means may outwardly pivot substantially wider than said transport frame, thereby being unobstructed by said main frame; and means for controllably pivoting said bale engagement means between said bale disengagement position and said bale engagement position whereby, upon pivotal movement of said bale engagement means to the disengagement position and advancement of said main frame over and about a bale, said power means may pivot said bale engagement means to the bale engagement position and lift means may raise said main frame and bale off said terrain thereby allowing said engaged raised bale to be shuttled from one location to another.

2. The universal bale shuttle of claim 1, wherein said pair of wheels track each other in parallel spaced apart relation.

3. The universal bale shuttle of claim 1, wherein said means for raising a lowering said main frame in relation to said terrain comprises:

a pair of spaced apart telescoping joints having first ends adapted to be connected to said frame and second ends adapted to rotatably secure a wheel;

fastener means for connecting said first ends of said telescoping joints to said main frame in spaced apart relation such that said pair of telescoping joints are separated by a distance greater than the size of the bales to be shuttled;

axle means for rotatably securing a wheel to each of said second ends of said telescoping joints; and said lift means including means for controllably retracting and extending said telescoping joints whereby said bale engagement means may be lowered by retracting said telescoping joints and said bale engagement means may be raised by extending said telescoping joints.

4. The universal bale shuttle of claim 3, wherein said means for retracting and extending said telescoping joints comprises at least one hydraulic cylinder.

5. The universal bale shuttle of claim 4, wherein said hydraulic cylinder is a conventional double acting hydraulic cylinder.

6. The universal bale shuttle of claim 1, wherein said means for raising and lowering said main frame in relation to said terrain comprises:

at least one telescoping joint having a first end adapted to be connected to a tractor and a second end adapted for connection to said main frame;

fastener means for connecting said second end of said telescoping joint to said main frame; and means for controllably retracting and extending said telescoping joint whereby said bale engagement means may be lowered by retracting said telescoping joint and said bale engagement means may be raised by extending said telescoping joint.

7. The universal bale shuttle of claim 6, wherein said means for retracting and extending said telescoping joint is at least one hydraulic cylinder.

8. The universal bale shuttle of claim 7, wherein said hydraulic cylinder is a conventional double acting hydraulic cylinder.

9. The universal bale shuttle of claim 1, wherein said drive means comprises:

a goose neck having first and second ends;

means for securing said first end of said goose neck to a tractor; and means for securing said second end of said goose neck to said frame for transverse pivotal movement about a generally upright axis.

10. The universal bale shuttle of claim 9, further comprising steering means for pivoting said goose neck about said axis whereby said frame may be steered to track to the left or right behind a tractor towing said shuttle.

11. The universal bale shuttle of claim 10, wherein said steering means comprises a hydraulic cylinder.

12. The universal bale shuttle of claim 11, wherein said hydraulic cylinder is a double acting hydraulic cylinder.

13. The universal bale shuttle of claim 1, wherein said bale engagement means comprises a pair of opposing clamping arms adapted to engage or disengage at least one bale.

14. The universal bale shuttle of claim 13, wherein said bale engagement means further comprises a plurality of said pairs of opposing clamping arms each adapted to engage or disengage at least one bale.

15. The universal bale shuttle of claim 14, wherein said means for controllably rotating said bale engagement means comprises a hydraulic cylinder.

16. The universal bale shuttle of claim 15, further comprising switching means for selectively independently controlling the rotational operation of each pair of opposing clamping arms.

17. The universal bale shuttle of claim 13, further comprising means for driving rotation of said opposing clamping arms about said pivotable connections of said opposing clamping arms.

18. The universal bale shuttle of claim 17, wherein said means for driving rotation of said pivotable connection comprises at least one hydraulic cylinder.

19. The universal bale shuttle of claim 13, wherein said clamping arms further comprise at least one tine opposingly interconnected to each of said opposing clamping arms.

20. The universal bale shuttle of claim 16 wherein said pivotal connections of each of said opposing clamping arms is lower on said upright member of said opposing clamping arms than the connection point of said hydraulic cylinder n said upright member, whereby said opposing clamping arms may extend to engage broken or irregular bales wider than said transport frame.

21. A universal bale shuttle adapted to transport round, square, broken, or irregular bales, comprising:
- an integral shuttle frame having an elongated main support beam and an inverted U-shaped transport frame section having opposing legs and a cross member beam extending between and connected to the tops of said opposing legs whereby an inverted U-shaped frame section is formed, said frame section attached to said main support beam and extending downwards therefrom,
- at least one wheel rotatably mounted on each leg of said inverted U-shaped transport frame section, whereby said frame may be rolled across terrain,
- a wheel lift assembly for raising or lowering said integral shuttle frame relative to said wheels,
- drive means for connecting said integral shuttle frame to a propulsion source whereby said integral shuttle frame may be moved across terrain,
- at least one pair of opposing bale engagement means connected to and depending from said elongated main support beam for pivotal movement about a generally longitudinal axis between a bale disengagement position wherein said pair of bale engagement means are pivoted oppositely outwardly to allow movement of aid frame over and about a bale on said ground and a bale engagement position wherein said pair of bale engagement means engages opposites sides of said bale so as to lift it from said terrain,
- said bale engagement means pivotally mounted on said elongated main support beam such that said bale engagement means may outwardly pivot substantially wider than said legs on said transport frame section such that the pivotal motion is unrestricted by said main support beam, whereby broken or irregular bales of width greater than said transport frame section may be engaged and thereby lifted, and
- means for controllably pivoting said bale engagement means between said bale disengagement position and said bale engagement position whereby, upon pivotal movement of said bale engagement means to the disengagement position and advancement of said integral shuttle frame over and about a bale, said power means may pivot said bale engagement means to the bale engagement position, said wheel lift assembly then operating to raise said integral shuttle frame and bale off said ground, thereby allowing said engaged raised bale to be shuttled from one location to another.

22. The universal bale shuttle of claim 14 wherein the longitudinal spacing of said pairs of opposing clamping arms along said elongated main support beam is adjustable, whereby said pairs of opposing claiming arms may be variably spaced apart to engage various sized bales of hay.

23. The universal bale shuttle of claim 19 wherein said tines each further comprise a bale tine bar slidably and rotatably mounted within a tine bracket tube.

* * * * *